United States Patent [19]
Roberts

[11] 4,353,441
[45] Oct. 12, 1982

[54] DUAL MODE DRUM BRAKE

[75] Inventor: James K. Roberts, South Bend, Ind.

[73] Assignee: The Bendix Corporation, Southfield, Mich.

[21] Appl. No.: 188,808

[22] Filed: Sep. 19, 1980

[51] Int. Cl.³ .............................................. F16D 51/20
[52] U.S. Cl. ................................. 188/328; 188/331; 188/341
[58] Field of Search ............... 188/106 A, 206 A, 325, 188/331, 328, 341

[56] References Cited

U.S. PATENT DOCUMENTS

| | | | |
|---|---|---|---|
| 2,775,315 | 12/1956 | Maruhn et al. | 188/331 |
| 2,989,150 | 6/1961 | Compton | 188/341 |
| 3,951,243 | 4/1976 | Chouings | 188/328 |
| 4,249,646 | 2/1981 | Roberts | 188/328 |

FOREIGN PATENT DOCUMENTS

| | | | |
|---|---|---|---|
| 1000246 | 1/1957 | Fed. Rep. of Germany | 188/341 |
| 484699 | 9/1953 | Italy | 188/341 |
| 485920 | 10/1953 | Italy | 188/341 |
| 702141 | 1/1954 | United Kingdom | 188/106 A |

Primary Examiner—Douglas C. Butler
Attorney, Agent, or Firm—Paul David Schoenle; Ken C. Decker

[57] ABSTRACT

In a drum brake assembly a pair of brake shoes (12, 14) are carried by a backing plate (10) and are engageable with the brake drum (18) to effect a service brake application. A parking lever (26) cooperates with the pair of brake shoes to engage the shoes with the brake drum and effect a parking brake application. A connector (34, 84, 94, 96) is slidably carried by the backing plate and pivotally anchors at least one of the brake shoes to the backing plate. The connector (34, 84) or another structure (128) transmits braking torque from one brake shoe to the other only during a parking brake application. The connector is releasably secured to the backing plate in a fixed position by a latch (36, 88, 114) which is connected to the parking lever. Movement of the parking lever to a position effecting a parking brake application causes the latch to release the connector for sliding movement relative to the backing plate. When a service brake application is effected, the connector remains fixed to the backing plate and the brake functions as a non-servo drum brake. When the parking brake is operated, the connector is released by the latch and is movable in the direction of brake drum rotation. Consequently, the brake functions as a servo drum brake during parking brake applications.

8 Claims, 11 Drawing Figures

DUAL MODE DRUM BRAKE

The invention relates to a dual mode drum brake assembly. The brake assembly includes a pair of brake shoes carried by a backing plate and engageable with a brake drum to retard rotation of the brake drum. The brake includes a suitable actuator operable by a vehicle operator to effect a service brake application and a parking lever cooperating with the pair of brake shoes to engage the shoes with the brake drum to effect a parking brake application. The backing plate of the brake slidably carries at least one connector which pivotally anchors one or both of the brake shoes to the backing plate. The connector is releasably secured in a fixed position on the backing plate by a latch during a service brake application. The brake includes structure for transferring braking torque from one brake shoe to the other during a parking brake application and structure for connecting the latch to the parking lever. Movement of the parking lever to a parking-brake applied position causes the latch to release the connector for sliding movement relative to the backing plate.

When a service brake application is effected, the brake functions as a non-servo drum brake because the connector is secured to the backing plate and brake torque developed by the brake shoes is transferred to the backing plate by the connector and latch. No transfer of brake torque from one brake shoe to the other occurs in this mode of brake operation.

A parking brake application causes the latch to release the connector for sliding movement relative to the backing plate so that the connector does not transfer brake torque to the backing plate. Either the connector or another structure transfers braking torque from one brake shoe to the other. Consequently, the brake functions as a servo drum brake in the parking brake mode of operation.

A drum brake is known in accordance with U.S. Pat. No. 4,101,011 to Burnett in which a pair of brake shoes are carried by a backing plate of the brake and are engageable with a brake drum by an expansible hydraulic motor. The pair of brake shoes pivotally anchor to an anchor plate which is permanently and fixedly secured to the backing plate of the brake. A service brake application results in pivotal movement of both of the brake shoes relative to the anchor plate as the shoes swing outwardly to engage the brake drum. Brake torque is transferred from the brake shoes to the backing plate only by the anchor plate and no forces are transferred from one brake shoe to the other by the anchor plate. This brake has no self-energizing or servo characteristics and it is commonly referred to as being of the non-servo type.

The brake illustrated in the Burnett patent includes a parking lever cooperating with the pair of brake shoes to effect a parking brake application. Torque developed by the pair of brake shoes during a parking brake application is also transferred to the backing plate only by the anchor plate and no servo effect is operative in the brake.

With a brake of the kind illustrated in the Burnett patent, the absence of servo effect during a parking brake application results in a marginal performance of the brake in situations requiring use of the parking brake. For example, when the vehicle is parked on a hill, or in emergency braking situations when the parking brake is used to arrest the motion of the vehicle after a failure of the service brake hydraulic system.

The invention as claimed is intended to remedy the drawbacks of prior drum brakes by providing a brake having non-servo characteristics during a service brake application, when the lower efficiency of a non-servo brake is desirable to prevent rear wheel lock-up and vehicle skids; and having servo characteristics during a parking brake application when the higher brake efficiency of such a brake is desirable.

The advantages offered by the invention are mainly that when the brake is used at the rear axle of an automotive vehicle also having service brakes on the front axle, the brake provides no servo effect and a relatively low braking efficiency during a service brake application. Because most of the braking function is performed by the front axle of the vehicle, it is desirable that the brakes at the rear axle have a relatively low efficiency during service brake applications so as to avoid rear wheel lock-up. Conversely, when the parking brake is applied, the brake has a servo characteristic which results in a greatly increased brake efficiency and much better parking brake performance than would be possible were the servo effect absent.

Further, the invention provides a dual mode drum brake wherein the service brake and parking brake modes of operation do not interfere with each other, even if both modes of braking are effected simultaneously. This feature is important because many vehicle operators use the service brake to assist in applying the parking brake by applying both brakes simultaneously. Additionally, on vehicles having a service brake hydraulic system which provides separate hydraulic circuits for the brakes at the front and rear axles of the vehicle, a failure of the front hydraulic circuit leaves the vehicle with only the non-servo rear brakes operational. By applying the parking brake and service brake simultaneously, the operator obtains maximum braking efficiency, because the rear brakes are converted to servo mode, and maximum braking effectiveness, because the brakes are actuated by both the service brake and parking brake systems.

Three ways of carrying out the invention are described in detail below with reference to drawings which illustrate only these three specific embodiments, in which.

Figure 1:
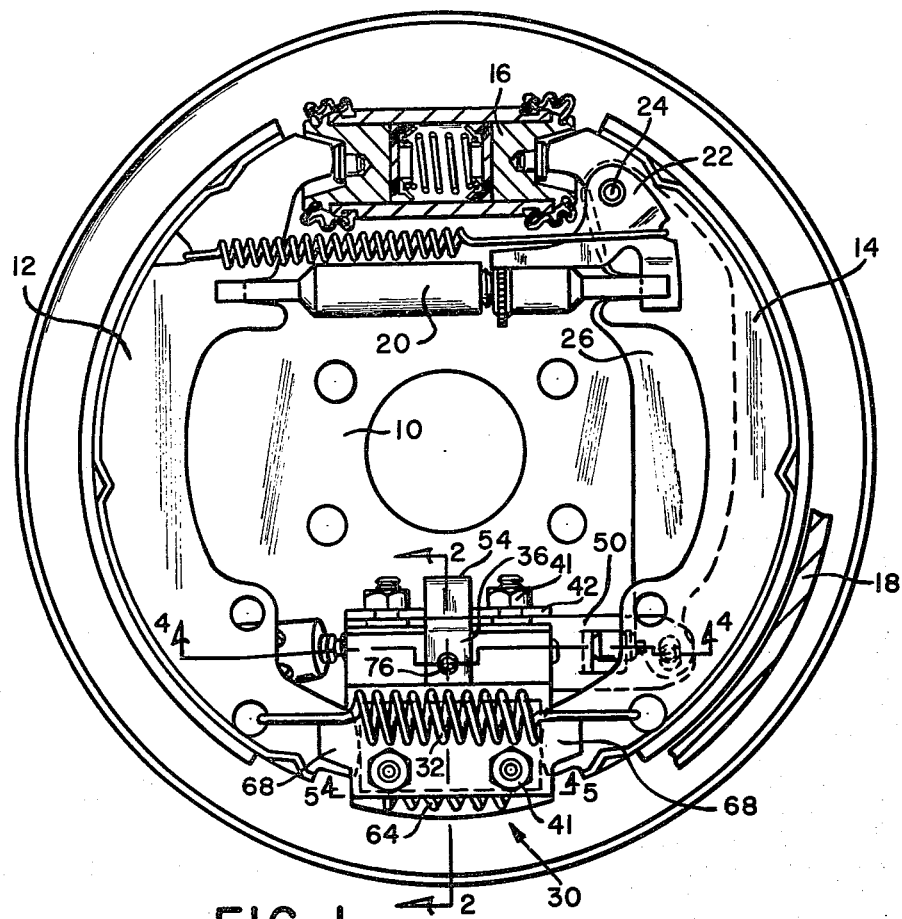
FIG. 1 is a view of a drum brake assembly, partly in cross-section, constructed in accordance with the present invention.

In the drum brake assembly of FIG. 1 a backing plate 10 supports a pair of brake shoes 12 and 14. A hydraulic actuator 16 cooperates with the pair of brake shoes 12 and 14 to urge the latter to move into engagement with a rotatable member 18 during a service brake application. An extendible strut 20 is engageable with the pair of brake shoes to compensate for lining wear. A pin 24 extends from the brake shoe 12 to pivotally mount a pawl 22, and a parking lever 26. The pawl 22 cooperates with the extendible strut 20 to adjust the latter responsive to wear of the friction linings carried by the brake shoes 12 and 14. The parking lever 26 is pivotal about the pin 24 to move the pair of brake shoes 12 and 14 into engagement with the rotatable member 18 during a parking brake application. The confronting ends of the pair of brake shoes opposite the hydraulic actuator 16 are retained in pivotal engagement with an anchor assembly 30 by a return spring 32.

Figure 2:
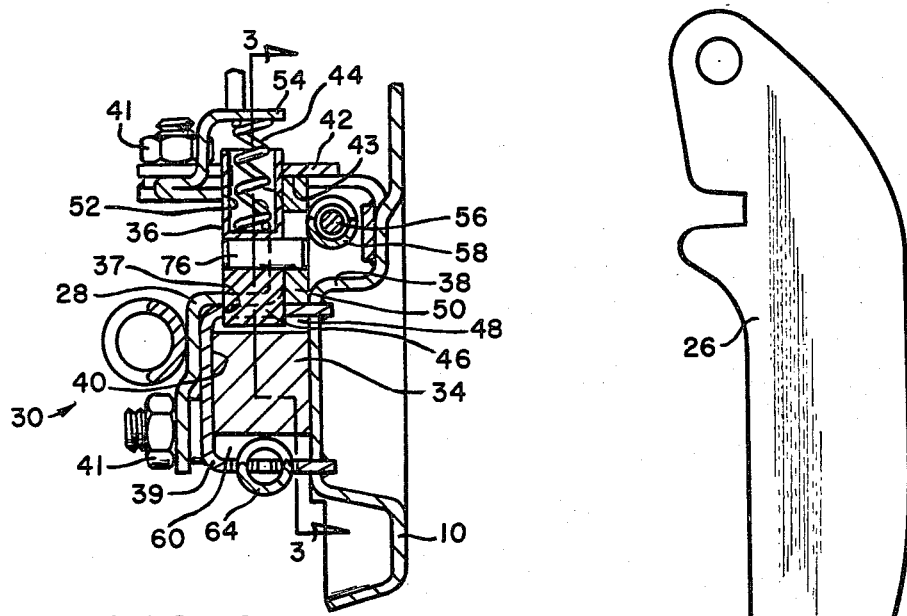
FIG. 2 is a fragmentary cross-sectional view taken along the line 2—2 of FIG. 1.
Figure 3:
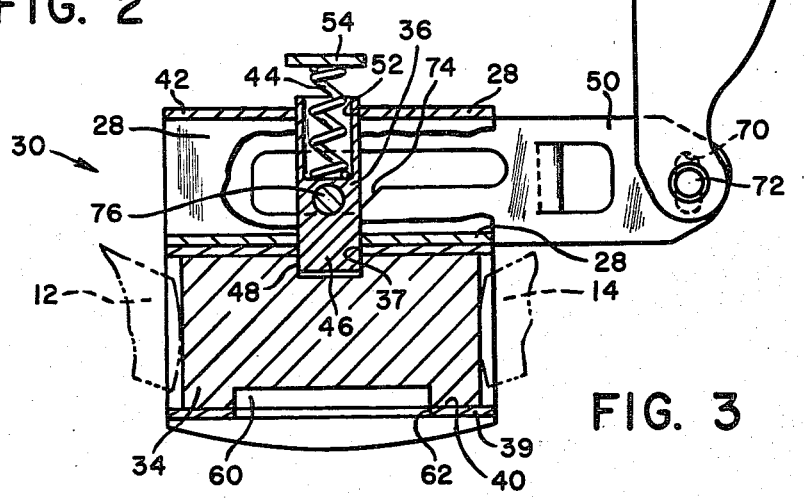
FIG. 3 is a fragmentary cross-sectional view taken along the line 3—3 of FIG. 2 and includes an isolated view of the parking lever.

Turning to FIGS. 2 and 3, the anchor assembly 30 includes a connector 34 and a latch 36. The connector 34 is a solid block of metal. In order to movably support the connector 34 on the backing plate 10, the backing plate 10 is stamped outwardly at 38 and a channel member 39 is welded thereto to define a slit 40 which receives the connector 34.

The latch 36 is slidably carried in a hole 37 defined by channel member 39. A coil spring 44 biases the latch to move downward, viewing FIG. 2. The latch 36 terminates in an end edge 46 and the connector 34 is cut out at 48 to receive the end edge 46 of latch 36. In addition, a cover plate 28 is secured by bolt and nut fasteners 41 to channel 39 and to a flange 42 which projects from the backing plate 10. The cover plate 28 cooperates with backing plate 10 and with the channel member 39 to define an aperture 43 in which is slidably received a second connector or plate 50. The cover plate 28 also defines an aperture 52 which, in cooperation with flange 42, receives and guides the upper end of latch 36. An ear 54 of cover plate 28 cooperates with the upper end of the coil spring 44.

Figure 4:
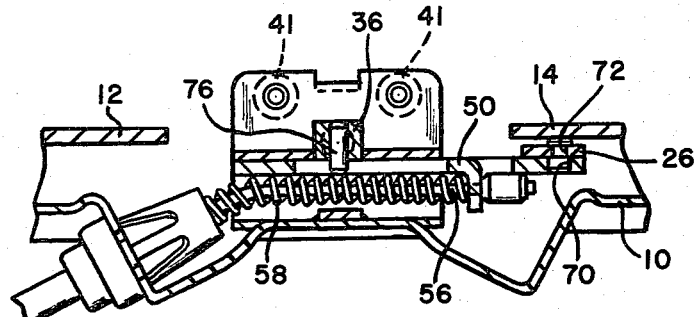
FIG. 4 is a fragmentary cross-sectional view taken along the line 4—4 of FIG. 1.

Viewing FIG. 4, the plate 50 is connected to the parking brake cable 56 of an automotive vehicle (not shown). Cable 56 is effective when operated by a vehicle operator to move the plate 50 to the left in the figure. A coil spring 58 biases the cable 56 and plate 50 to the right in the figure. A slot 70 defined in the end of plate 50 receives a pin 72 which is connected to the lower end of the parking lever 26 so that sliding movement of the plate 50 causes pivotal movement of the parking lever.

Figure 5:
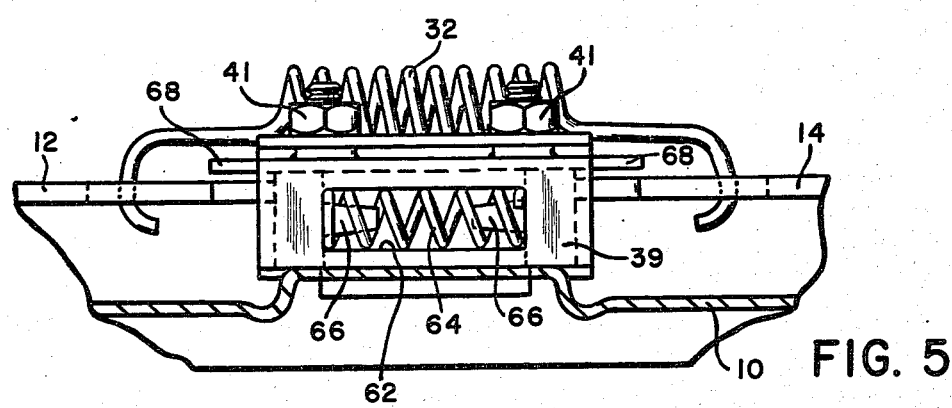
FIG. 5 is a fragmentary cross-sectional view taken along the line 5—5 of FIG. 1.
Figure 7:
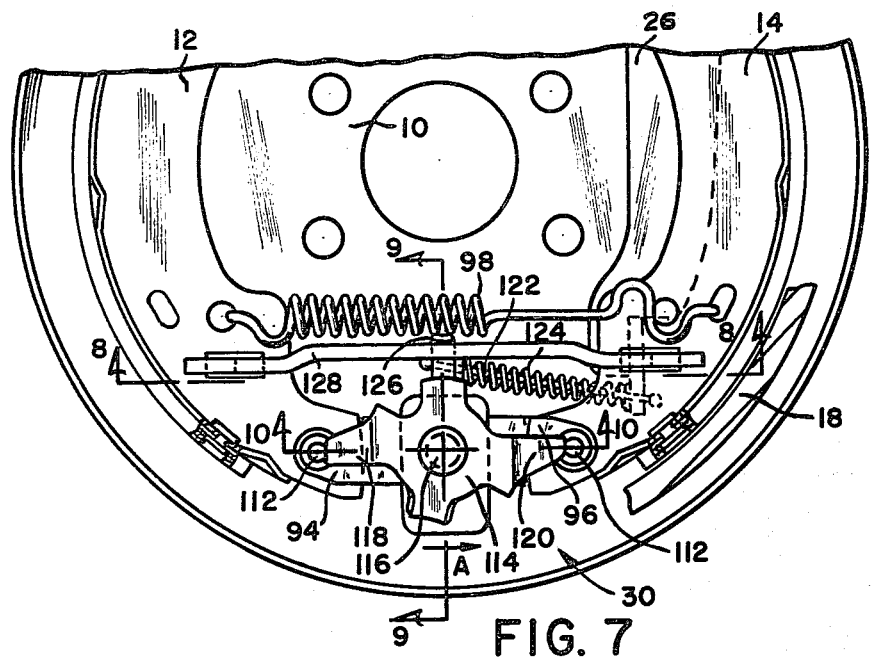
FIG. 7 is a fragmentary view of yet another embodiment of my invention.
Figure 8:
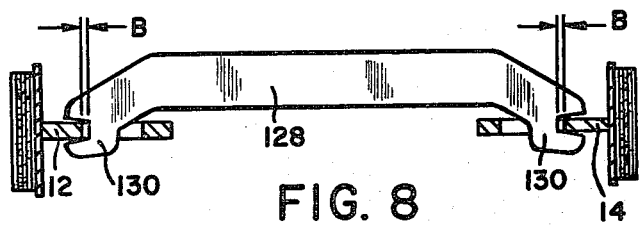
FIG. 8 is a fragmentary cross-sectional view taken along the line 8—8 of FIG. 7.

When the end edge 46 of latch 36 is disposed within the connector cutout 48, the connector 34 is in a neutral position. Viewing FIGS. 3 and 5, a recess 60 on the connector 34 and an aperture 62 on the channel 39 each receive a portion of a centering spring 64. The centering spring resiliently opposes movement of the connector 34 away from its neutral position. Viewing FIG. 5, the centering spring 64 is retained within the recess 60 and aperture 62 by a pair of guides 66 on the channel 39. The guides 66 extend into the aperture 62.

A cam slot 74 is defined in plate 50, viewing FIG. 3. A pin 76 is carried by the latch 36 and received in the slot 74 such that movement of the plate 50 to the left from its position in the figure causes the end edge 46 of latch 36 to be lifted out of the cutout 48 of connector 34. The latch 36 is rectangular or square in cross-section, as is best illustrated in FIG. 4. The apertures 37 and 52 in which the latch 36 slides are also rectangular so that the latch resists being rotated by the engagement of pin 76 with the cam slot 74 of plate 50.

The channel 39 includes a pair of ears 68 which prevent axial separation between the backing plate 10 and the pair of brake shoes 12 and 14 when the latter are engaged with the connector 34.

Figure 6:
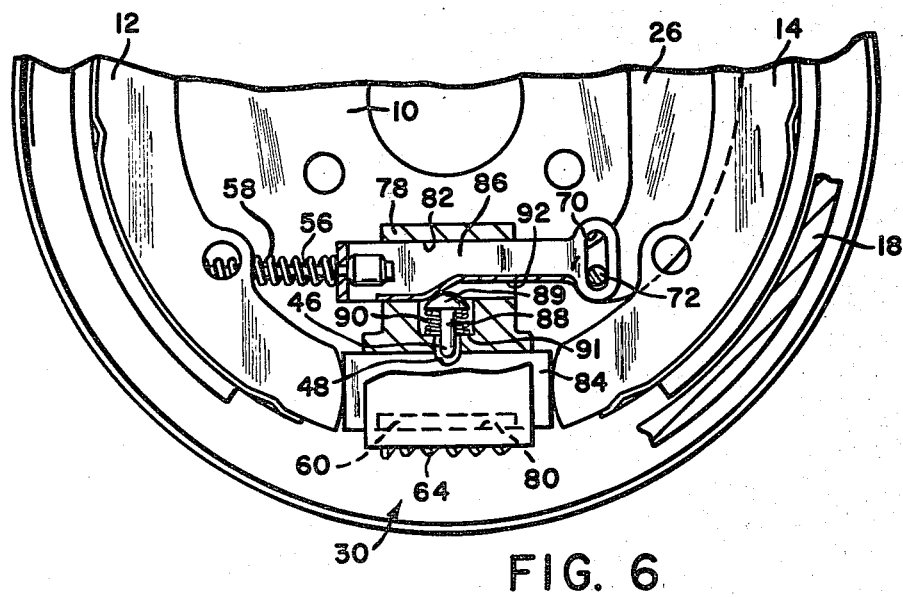
FIG. 6 is a fragmentary cross-sectional view of another embodiment of my invention and is similar to FIG. 1.
Figure 9:
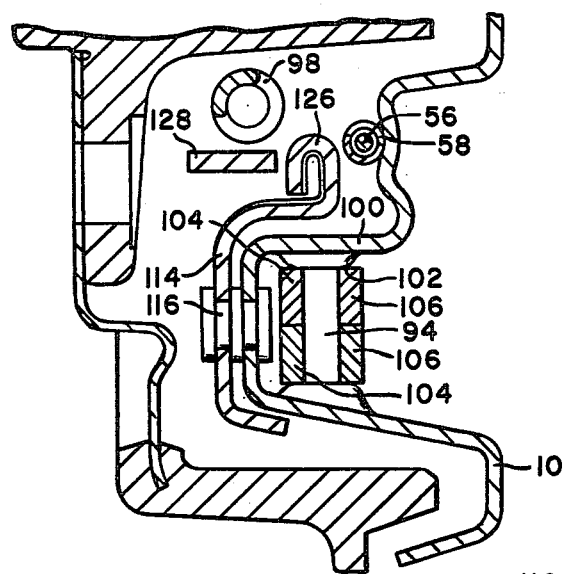
FIG. 9 is a fragmentary cross-sectional view taken along the line 9—9 of FIG. 7.
Figure 10:
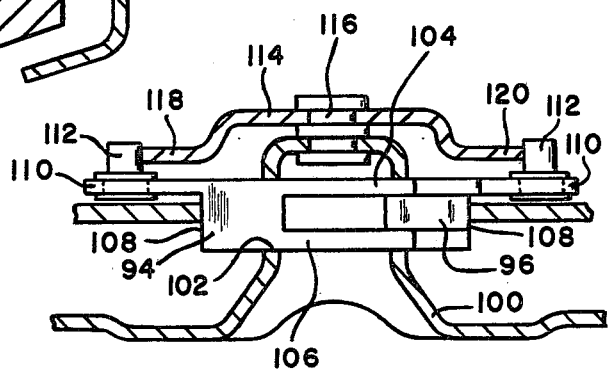
FIG. 10 is a fragmentary cross-sectional view taken along the line 10—10 of FIG. 7.

FIG. 6 is a cross-sectional view similar to FIG. 1 and illustrates another embodiment of my invention. In the brake of FIG. 6, anchor assembly 30 includes a housing 78 which is carried by the backing plate 10. The housing 78 defines slots 80 and 82, in which are slidably received a connector 84 and a plate 86, respectively. The plate 86 is connected to the parking brake cable 56 of a vehicle (not shown). A slot 70 is defined in the plate 86 and receives a pin 72 connected to the parking lever 26. A return spring 58 biases the plate 86 to the right in the figure.

A latch 88 is slidably received in a bore 90 defined in anchor assembly housing 78 between the slots 80 and 82. The latch 88 includes an end edge 46 which is engageable with a cutout 48 of connector 84. Latch 88 includes an enlarged, rounded head 89. A coil spring 91 biases the latch 88 upward and into engagement at its head with a cam surface 92 defined on plate 86.

A recess 60 on the connector 84 and an aperture 62 in the housing 78 each receive a portion of a centering spring 64. A pair of guides 66 on the housing 78 cooperate with the centering spring 64 to retain it in the apertures 60 and 62.

Turning now to FIGS. 7-11, yet another embodiment of my invention is illustrated.

In the embodiment illustrated by FIGS. 7-11, the anchor assembly 30 includes a pair of connectors 94 and 96. The ends of the brake shoes 12 and 14 are biased toward each other and maintained in pivotal engagement with the connectors 94 and 96 by a return spring 98. In order to movably support the connectors 94 and 96 on the backing plate 10, the plate is stamped outward at 100 to define a slot 102 which receives the connectors 94, 96.

Figure 11:
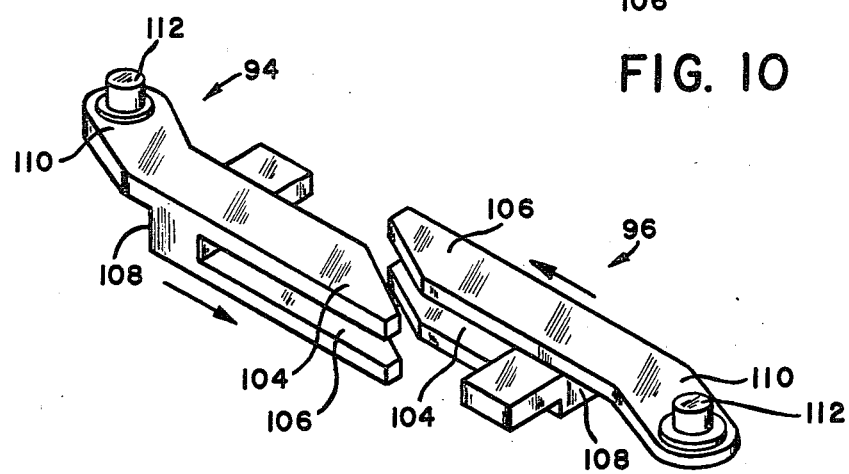
FIG. 11 is a perspective view of the connectors of the embodiment illustrated in FIGS. 7-10.

Viewing FIG. 11, it will be seen that each of the connectors 94 and 96 includes a pair of legs 104, 106 which slidably engage the corresponding legs of the other connector. Consequently, the connectors 94 and 96 and movable in the slot 102 independently of each other. An abutment 108 is defined by each of the connectors. The respective end of a brake shoe pivotally engages the abutment 108. Each connector 94 and 96 includes an ear 110 which carries an axially-extending pin 112.

A cam plate 114 is pivotally carried by the backing plate on a pin 116 which is riveted to the backing plate. The cam plate 114 includes a pair of cam lobes 118 and 120, viewing FIG. 7, which engage the pins 112 carried by connectors 94 and 96 respectively. The cam lobes 118 and 120 are reverse mirror images of each other so that rotation of the cam plate in the direction of arrow A, viewing FIG. 7, allows the connectors to move inward toward each other. Rotation of the cam plate in the direction opposite arrow A separates the connectors and the brake shoes 12 and 14 to the position shown in FIG. 7.

Cam plate 114 is connected to parking lever 26 by a rod 122 which carries a coil spring 124. The coil spring 124 is disposed between a tab 126 on the cam plate and the lever 26. Parking lever 26 is connected to the parking brake cable 56 of a vehicle (not shown). As a result, a parking brake application rotates the cam plate in the direction of arrow A via the spring 124. A parking lever return spring 58 acting through cam plate 114 and connectors 94, 96 on brake shoes 12 and 14 is of a strength sufficient to overcome the return spring 98 and to return the shoes and connectors 94 and 96 to their FIG. 7 positions when the parking brake cable is released after a parking brake application.

A fixed-length strut 128 is connected to the brake shoes 12, 14 adjacent anchor assembly 30. The strut 128 defines hooks at 130 which are engageable with the brake shoe webs to space apart the brake shoes. When the cam plate 114 is in the position illustrated in FIG. 7, the cam lobes 118 and 120 space apart the brake shoes via the connectors 94 and 96. As a result, the hooked ends 130 of the strut 128 define a clearance B, viewing FIG. 8, with the brake shoes.

The brakes embodying my invention operate as follows:

When the brake illustrated FIGS. 1-5 is maintained in a non-braking condition as illustrated in the Figures, the end edge 46 of latch 36 is received in cutout 48 of connector 34. Consequently, movement of connector 34 relative to backing plate 10 is prevented.

During a service brake application, the hydraulic actuator 16 receives pressurized fluid to move the pair of brake shoes radially outward. As a result, the brake shoes pivot about the connector 34 until the brake shoes frictionally engage the rotatable member 18. Because the parking lever 26 is maintained in a non-braking position, the latch 36 remains engaged with connector 34. Consequently, during a service brake application, braking torque developed by the pair of brake shoes engaging the brake drum is transmitted to the connector 34 and from the connector to the backing plate 10 by the latch 36.

When parking lever 26 is rotated in a clockwise direction during a parking brake application, the plate 50 is shifted to the left, viewing FIG. 3, and latch 36 is lifted out of engagement with the connector 34 by the operation of the cam slot 74 on pin 76. Consequently, the connector 34 is free to move relative to the backing plate 10 in slot 40. Continued rotation of the parking lever 26 about strut 20 and pin 22 moves the brake shoes 12 and 14 into engagement with the rotatable member 18. If, while the parking brake is applied, the rotatable member 18 is rotated in either direction, the brake shoes are free to rotate slightly with the rotatable member. Brake torque developed by one of the brake shoes is transferred to the other shoe by connector 34 so as to urge the other brake shoe into tighter engagement with the brake drum. A circumferential movement is permitted for connector 34 because the connector is disengaged from the latch 36 and is free to move within the slot 40. The braking torque developed during a parking brake application is transmitted to the hydraulic actuator 16 and to the backing plate 10.

When the parking lever is released, the centering spring 64 moves connector 34 to a center position in which the latch 36 is engaged with cut-out 48 by spring 44.

In the brake of FIG. 6, a service brake application causes brake torque to be transferred to the backing plate 10 by anchor assembly 30 because the latch 88 is held in engagement with connector 84 by the cam surface 92 of the plate 86.

When a parking brake application is effected, the parking lever is rotated clockwise and the plate 86 is shifted to the left viewing FIG. 6. The action of the cam surface 92 on the head 89 of latch 88 allows the latch to be raised out of engagement with the connector 84 by spring 91. Consequently, the connector is free to move in slot 80 relative to the backing plate 10. Continued rotation of the parking lever 26 moves the brake shoes 12 and 14 into engagement with the brake drum to effect a parking brake application. If the brake drum is rotated in either direction while the parking brake is applied, the connector 84 will transmit braking torque from one brake shoe to the other, as previously explained with regard to the embodiment illustrated by FIG. 1.

When the parking brake is released, the centering spring 64 moves the connector 84 to a centered position and the plate 86 is moved to the right by spring 58 so that the latch 88 is cammed into engagement with the connector 84 by the cam surface 92.

In the brake illustrated by FIGS. 7-11, when the brake is maintained in a non-braking condition, the pins 112 carried by connectors 94 and 96 rest upon the crests of the cam lobes 118, 120 of cam plate 114. Consequently, movement of the connector 94 to the right and movement of connector 96 to the left in the figure is prevented.

During a service brake application, brake torque developed by the brake shoes is transferred to the connectors 94 and 96 and from the connectors to the cam plate 114 by the pins 112. Cam plate 114 transfers the brake torque to backing plate 10 through the pin 116. Because the parking lever 26 remains in a nonbraking position, the strut 128 is spaced from the brake shoes by the clearance B and does not transmit any brake torque from one brake shoe to the other. During a service brake application, the brake shoes are spaced apart by the cam plate 114 and connectors 94 and 96.

When the parking lever 26 is rotated in a clockwise direction to effect a parking brake application, the coil spring 124 is compressed and exerts a force on tab 126 of cam plate 114. The force exerted by the coil spring 124 on the tab 126 is sufficient to overcome the frictional engagement of the pins 112 with the cam plate lobes 118 and 120. Consequently, the cam plate 114 is rotated in the direction of arrow A, viewing FIG. 7, so that the pins 112 no longer rest upon the crest of the cam lobes 118 and 120. As a result, the brake shoes are spaced apart by the strut 128 and the connectors 94 and 96 are free to move in the slot 102 relative to each other and to the backing plate 10. If the brake drum is rotated in either direction during a parking brake application, the strut 128 transfers brake torque from one brake shoe to the other to engage the latter more tightly with the brake drum.

When the parking brake is released, the lever 26 is moved counterclockwise by return spring 58. The rod 122 provides a solid mechanical connection of fixed length between the lever 26 and cam plate 114. Consequently, the cam plate 114 is rotated in a direction opposite arrow A and the cam lobes 118 and 120 cam the connectors 94 and 96 outward to their FIG. 1 positions. The spring 58, acting through the rod 22 and cam plate 114 is of sufficient strength to overcome the bias of spring 98 on the brake shoes 12 and 14. Consequently, the brake shoe webs are lifted off of the hooks 130 of the strut 128 so that the strut is carried on the brake shoe webs during service brake applications and does not transmit force from one brake shoe to the other.

I claim:

1. In a drum brake assembly comprising a pair of brake shoes carried by a backing plate and engageable with a rotatable member to effect a service brake application, a parking lever cooperating with the pair of brake shoes to engage the latter with the rotatable member to effect a parking brake application, an anchor assembly carried by said backing plate between confronting ends of said brake shoes, said anchor assembly including a circumferentially-movable connector and a latch means engaging said connector to substantially prevent circumferential movement of said connector during a service brake application, one of said brake shoes pivotally engaging said connector so as to transfer braking torque to said backing plate via said connector and latch means during a service brake application, characterized by said latch means including a cam-defining member connected to said parking brake lever and movable upon a parking brake application to release said connector for circumferential movement, and means for transferring braking torque between said confronting brake shoe ends during a parking brake application.

2. The invention of claim 1 wherein both of said brake shoes pivotally engage said connector.

3. The invention of claim 1 wherein said anchor assembly includes a second circumferentially-movable connector, the other of said brake shoes pivotally engaging said second connector.

4. The invention of claim 3 wherein said torque-transferring means includes a fixed-length strut engaging said pair of brake shoes.

5. The invention of claim 3 or 4 wherein said cam-defining member pivotally engages said backing plate, said cam-defining member including a pair of reversed mirror-image cam lobes engaging respective one of said connectors.

6. The invention of claim 1 or 2 wherein said connector includes a cutout portion, said latch means further including a latching member slidably carried by said anchor assembly and received in said cutout so as to prevent circumferential movement of said connector, said latching member slidably engaging said cam-defining member so that said latching member moves out of said cutout responsive to movement of said cam-defining member incident to a parking brake application.

7. In a drum brake assembly comprising a pair of brake shoes carried by a backing plate and engageable with a brake drum to effect a service brake application, a parking lever cooperating with said brake shoes to engage the latter with said brake drum to effect a parking brake application, connector means slidably carried by said backing plate for pivotally anchoring one of said brake shoes to said backing plate, latching means for releasably securing said connector means to said backing plate during a service brake application so that said connector means substantially prevents circumferential movement of said one brake shoe, said latching means being movable between a first position in which said latching means secures said connector means to said backing plate and a second position in which said connector means is free to move relative to said backing plate, said latching means including cam-defining means for camming said latching means between said first and second positions responsive to movement of said cam-defining means, and linkage means for moving said latching means to said second position via said cam-defining means responsive to movement of said parking lever incident to a parking brake application.

8. A drum brake comprising:

a pair of brake shoes slidably carried on a backing plate, said pair of brake shoes having pairs of confronting ends;

a hydraulic actuator carried by said backing plate between one pair of said confronting brake shoe ends, said actuator being operable to move said brake shoes into engagement with a brake drum to effect a service brake application;

an adjustable-length strut carried by said brake shoes adjacent to said hydraulic actuator to adjustably space apart said one pair of confronting brake shoe ends;

a parking lever pivotally engaging one of said brake shoes and pivotally engaging said adjustable-length strut, said parking lever cooperating with said brake shoes to effect a parking brake application and being movable between a first position in which said brake shoes are spaced from said brake drum and a second position in which said brake shoes are engaged with said brake drum;

a connector shiftably carried by said backing plate for reciprocating circumferential movement, said connector being received between and invariantly spacing apart the other pair of confronting brake shoe ends, said connector defining a cutout;

a latch member slidably carried by said backing plate for movement perpendicularly to said connector, said latch member being movable between a first location in which an end edge of said latch member is received in said cutout of said connector to substantially prevent movement of said connector and a second location in which said latch member is spaced from said connector so that said connector is free to move circumferentially;

a cam-defining member slidably carried by said backing plate and defining a cam surface engageable with said latch member for moving said latch member between said first and said second locations;

means for connecting said cam-defining member to said parking lever so that said cam-defining member moves said latch member from said first location to said second location responsive to movement of said parking lever from said first position to said second position, respectively.

* * * * *